(No Model.)
E. A. JONES.
SWINGING GATE.
No. 316,041. Patented Apr. 21, 1885.
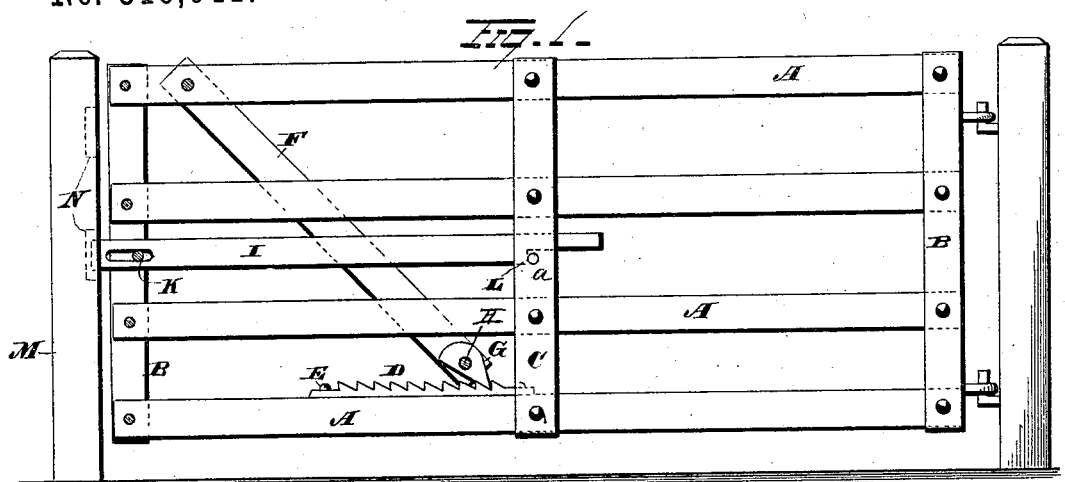
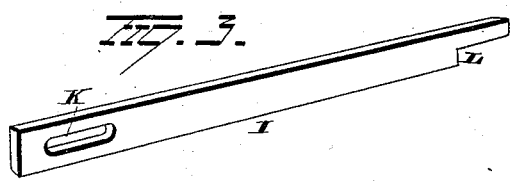
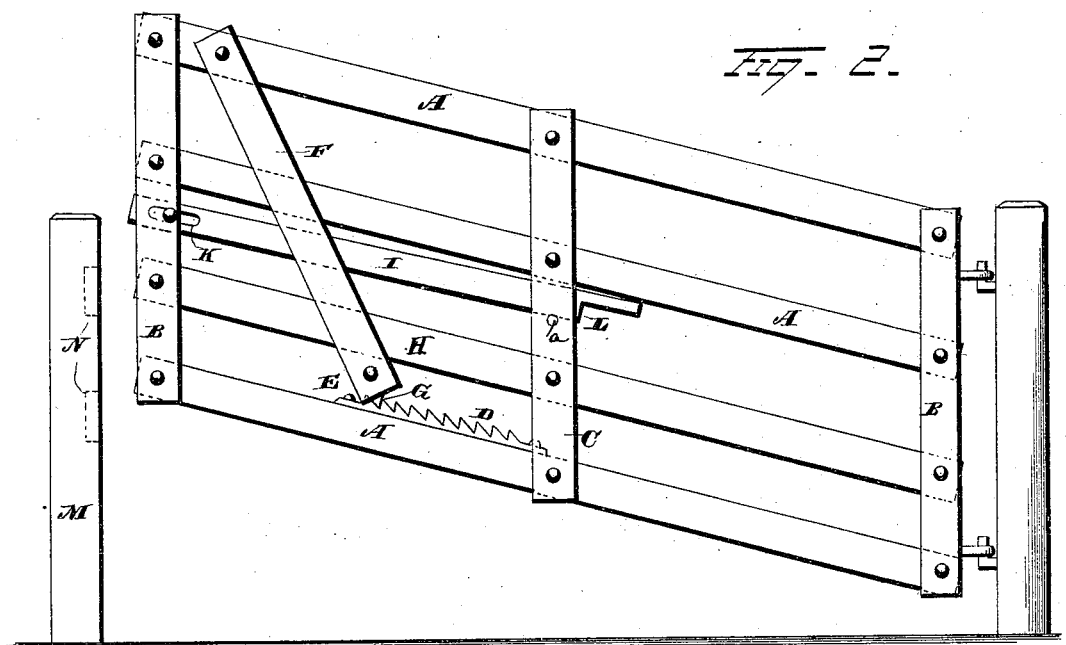
WITNESSES
F. Nottingham
Geo. F. Downing
INVENTOR
E. A. Jones,
By H. A. Seymour,
ATTORNEY

UNITED STATES PATENT OFFICE.

EDGAR A. JONES, OF THREE RIVERS, MICHIGAN.

SWINGING GATE.

SPECIFICATION forming part of Letters Patent No. 316,041, dated April 21, 1885.

Application filed May 13, 1884. (No model.)

*To all whom it may concern:*

Be it known that I, EDGAR A. JONES, of Three Rivers, in the county of St. Joseph and State of Michigan, have invented certain new and useful Improvements in Swinging Gates; and I do hereby declare the following to be a full, clear, and exact description of the invention, such as will enable others skilled in the art to which it appertains to make and use the same.

My invention relates to an improvement in swinging gates, the object being to provide a gate the free end of which, when raised, may be automatically locked at any desired height, for the purpose of permitting the passage of small live stock, or when it is found necessary to avoid snow-drifts and like obstacles. A further object is to provide a gate of this character in which the tendency to sag and strain will be altogether avoided, my preferred construction affording an equable brace on all parts of the gate. A further object is to provide a gate with a sliding latch adapted to hold the gate in closed position when the latter is in any desired adjustment. A further object is to provide a device of the above character which shall be simple and economical in construction, and practicable, durable, and efficient in use; and with these ends in view my invention consists in certain features of construction and combinations of parts, as will be more fully described, and pointed out in the claims.

In the drawings, Figure 1 is a view in side elevation with one of the upright studs removed, showing my improved latch. Fig. 2 is a view showing the gate with its free end in an elevated position. Fig. 3 is a detached view of the latch.

The horizontal bars A may be of any preferred number, and are pivotally secured at each end between the vertical bars B, and are further pivotally secured at or about their center between the bars C, this pivotal adjustment naturally permitting a vertical movement to the free end of the gate. The lower bar of the gate is provided with a ratchet-bar, D, which is rigidly secured on the surface of the said bar by means of the screws E; or, if preferred, the said ratchet-bar may be sunk into the said lower bar, thus permitting the ratchet-teeth to rest flush therewith, the said ratchet-bar being located forward of the vertical center bar, C, as shown.

To the upper bar of the gate, at its forward end, is pivotally secured the depending arm F, which is made in two sections, and has its lower end provided with the tooth G, which is secured therein by means of the pivots or screws H. The tooth G is preferably shaped as shown, and is adapted to register with the ratchet-bar D, as shown. As the lower end of arm F rests loosely on the ratchet-bar, it follows that when the free end of the gate is elevated the tooth on the lower end of the arm F rides over the ratchet-teeth. As soon, however, as the upward movement of the free end of the gate is discontinued, the tooth G interlocks with the ratchet-bar and locks the gate in an elevated adjustment. To lower the gate to its normal position, it is simply necessary to release the tooth G from the ratchet-bar, when the gate will fall by gravity.

For the purpose of locking the gate against motion, I provide a sliding latch-bar, I, which is provided at its forward end with the elongated slot K, through which a bolt or rivet secured to the forward bars, B, passes, thus holding the latch against vertical movement. The rear of the latch is cut away, as shown, forming the shoulder L, by means of which the latch is secured against backward motion when the gate is locked in any desired adjustment, the rear portion of said latch resting against the pivot.

The gate is secured to the post by means of any preferred hinge. The post M is provided with the holes N in the face thereof, adapted to receive the latch I.

Having fully described my invention, what I claim as new, and desire to secure by Letters Patent, is—

1. The combination, with the pivotal bars and a depending arm pivoted to one of said bars and engaging at its lower end a ratchet secured to another bar, of a post having a series of latch-keepers therein, a sliding latch provided with a shoulder, and a pin passing through said gate and forming a bearing or stop for said shoulder, substantially as set forth.

2. In a swinging gate, the combination, with the pivotal bars and a depending arm secured to one of said bars and adapted to automatically secure said gate in vertical adjustment, of a sliding latch, the forward end of which is provided with an elongated slot, by means of which the latch is held against vertical movement, the rear end of said latch being cut away, as shown, by means of which the gate is held in locked adjustment, substantially as set forth.

In testimony whereof I have signed this specification in the presence of two subscribing witnesses.

EDGAR A. JONES.

Witnesses:
   GEO. A. LANE,
   DWIGHT DUNLAP.